(12) United States Patent
Oe et al.

(10) Patent No.: US 10,752,260 B2
(45) Date of Patent: Aug. 25, 2020

(54) DRIVING ASSISTANCE DEVICE FOR VEHICLE, NON-TRANSITORY COMPUTER-READABLE STORAGE MEDIUM, AND CONTROL METHOD

(71) Applicant: TOYOTA JIDOSHA KABUSHIKI KAISHA, Toyota-shi, Aichi-ken (JP)

(72) Inventors: Yoshihiro Oe, Kawasaki (JP); Hirofumi Kamimaru, Fukuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/367,861

(22) Filed: Mar. 28, 2019

(65) Prior Publication Data

US 2019/0337531 A1   Nov. 7, 2019

(30) Foreign Application Priority Data

May 7, 2018 (JP) ................................ 2018-089450

(51) Int. Cl.
| | |
|---|---|
| *B60Q 1/00* | (2006.01) |
| *B60W 50/14* | (2020.01) |
| *B60W 40/09* | (2012.01) |
| *G01C 21/36* | (2006.01) |

(52) U.S. Cl.
CPC ............ *B60W 50/14* (2013.01); *B60W 40/09* (2013.01); *G01C 21/3641* (2013.01); *B60W 2050/143* (2013.01)

(58) Field of Classification Search
None
See application file for complete search history.

(56) References Cited

U.S. PATENT DOCUMENTS

| | | | | |
|---|---|---|---|---|
| 2014/0278052 | A1* | 9/2014 | Slavin | ............... G01C 21/3492 |
| | | | | 701/400 |
| 2016/0159366 | A1* | 6/2016 | Tsuyunashi | ........... B60W 40/09 |
| | | | | 340/439 |
| 2017/0219375 | A1* | 8/2017 | Murayama | .......... G01C 21/3415 |
| 2019/0193751 | A1* | 6/2019 | Fernando | .............. B60W 40/09 |

FOREIGN PATENT DOCUMENTS

| | | |
|---|---|---|
| JP | 2006-268480 A | 10/2006 |
| JP | 2015-018397 A | 1/2015 |
| WO | 2016/021001 A1 | 2/2016 |

\* cited by examiner

*Primary Examiner* — Julie B Lieu
(74) *Attorney, Agent, or Firm* — Oliff PLC (57) ABSTRACT

A driving assistance device for a vehicle includes a storage unit configured to store a position of a first point on a road map where a traveling environment of a road changes, and a controller configured to output an alarm for alerting a driver of a vehicle after the vehicle has passed through the first point.

13 Claims, 6 Drawing Sheets

| FIRST POINT ID | FIRST POINT POSITION | ROAD INFORMATION ||||| USER INFORMATION |||
| --- | --- | --- | --- | --- | --- | --- | --- | --- |
| | | ROAD LINK ID | NUMBER OF LANES | ROAD WIDTH | TRAVELING ENVIRONMENT CHANGE | USER ID | FAMILIAR POINT POSITION | DRIVING TENDENCY |
| N01 | *** | L01 | *** | *** | *** | U01 | *** | *** |
| | | | | | | U02 | *** | *** |
| | | | | | | ... | ... | ... |

DRIVING ASSISTANCE DEVICE FOR VEHICLE, NON-TRANSITORY COMPUTER-READABLE STORAGE MEDIUM, AND CONTROL METHOD

INCORPORATION BY REFERENCE

The disclosure of Japanese Patent Application No. 2018-089450 filed on May 7, 2018 including the specification, drawings and abstract is incorporated herein by reference in its entirety.

BACKGROUND

1. Technical Field

The present disclosure relates to a driving assistance device for a vehicle, a non-transitory computer-readable storage medium storing a program, and a control method.

2. Description of Related Art

In the related art, a driving assistance technique that presents information to a driver of a vehicle is known. For example, Japanese Unexamined Patent Application Publication No. 2006-268480 (JP 2006-268480 A) discloses an information providing device for a vehicle that provides information for attracting more attention to a route familiar to a driver. WO 2016021001 discloses a warning notification system that, when a moving route of a vehicle is a familiar route, determines whether or not to issue warning notification based on a previous traveling situation and a current traveling situation of the moving route.

SUMMARY

A driver is familiar with a traveling environment of a road on which a vehicle travels, whereby a problem in that the driver pays less attention to a driving operation may occur. In the related art described in JP 2006-268480 A and WO 2016021001, while an alarm is performed to a driver familiar with a traveling environment of a certain road, it is assumed that the driver has an experience of traveling on the road previously. For this reason, in the related art, it is not possible to perform an alarm when the driver of the vehicle is traveling on a road on which the driver has no experience of traveling, and it is not always possible to reduce the occurrence of a problem due to familiarity of the driver with the traveling environment of the road.

The disclosure provides a driving assistance device for a vehicle, a non-transitory computer-readable storage medium storing a program, and a control method that, even though a driver of a vehicle is traveling on a road on which the driver has no experience of traveling, reduce the occurrence of a problem due to familiarity of the driver with a traveling environment of the road.

A first aspect of the disclosure relates to a driving assistance device. The driving assistance device includes a storage unit and a controller. The storage unit is configured to store a position of a first point on a road map where a change in traveling environment of a road exists. The controller is configured to output an alarm for alerting a driver of the vehicle after the vehicle has passed through the first point.

In the driving assistance device according to the first aspect, the controller may be configured to determine whether or not the driver is familiar with change in traveling environment based on at least one of change in vehicle information of the vehicle and change in driving behavior of the driver after the vehicle has passed through the first point. The controller may be configured to, when determination is made that the driver is familiar with the change in traveling environment, transmit, to a server, a position of the vehicle when determination is made that the driver is familiar with the change in traveling environment.

In the driving assistance device according to the first aspect, the controller may be configured to receive a position of a second point on the road map corresponding to the first point from a server. The controller may be configured to, when the position of the second point substantially coincides with a position of the vehicle after the vehicle has passed through the first point, output the alarm.

In the driving assistance device according to the aspect, the second point may be decided based on a position of another vehicle when determination is made that another driver who drives the other vehicle is familiar with change in traveling environment. The determination may be made based on at least one of change in vehicle information of the other vehicle and change in driving behavior of the other driver after the other vehicle has passed through the first point previously.

In the driving assistance device according to the aspect, the other vehicle may be a vehicle driven by the other driver who has a tendency of a driving operation substantially coincident with the driver of the vehicle.

In the driving assistance device according to the aspect, the second point may be decided based on (i) another first point on the road map through which the vehicle has passed previously and (ii) a position of the vehicle when determination is made that the driver is familiar with change in traveling environment based on at least one of change in vehicle information of the vehicle and change in driving behavior of the driver after the vehicle has passed through the other first point previously.

In the driving assistance device according to the aspect, the other first point may be a first point that has road information substantially coincident with the first point among a plurality of first points on the road map.

In the driving assistance device according to the aspect, the second point may be set to a point at a predetermined distance from the first point in a moving direction of the vehicle along a road.

In the driving assistance device according to the first aspect, the controller may be configured to output the alarm when determination is made that the driver is familiar with change in traveling environment after the vehicle has passed through the first point. The determination may be made based on at least one of (i) change in vehicle information of the vehicle and (ii) change in driving behavior of the driver.

In the driving assistance device according to the first aspect, change in traveling environment of the road may be at least one of (i) change from a general road to an expressway, (ii) change from a curve road to a straight road, and (iii) change from a parking lot to a road.

A second aspect of the disclosure relates to a non-transitory computer-readable storage medium storing a driving assistance program for a vehicle. The driving assistance program causes a controller to execute storing a position of a first point on a road map where a traveling environment of a road changes, and outputting an alarm for alerting a driver of the vehicle after the vehicle has passed through the first point.

A third aspect of the disclosure relates to a control method of a driving assistance device for a vehicle. The control method includes storing a position of a first point on a road map where a traveling environment of a road changes, and outputting an alarm for alerting a driver of the vehicle after the vehicle has passed through the first point.

With the driving assistance device for a vehicle, the non-transitory computer-readable storage medium storing a program, and the control method according to the aspects, even though a driver of a vehicle travels on a road on which the driver has no experience of traveling, it is possible to reduce the occurrence of a problem due to familiarity of the driver with a traveling environment of the road.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
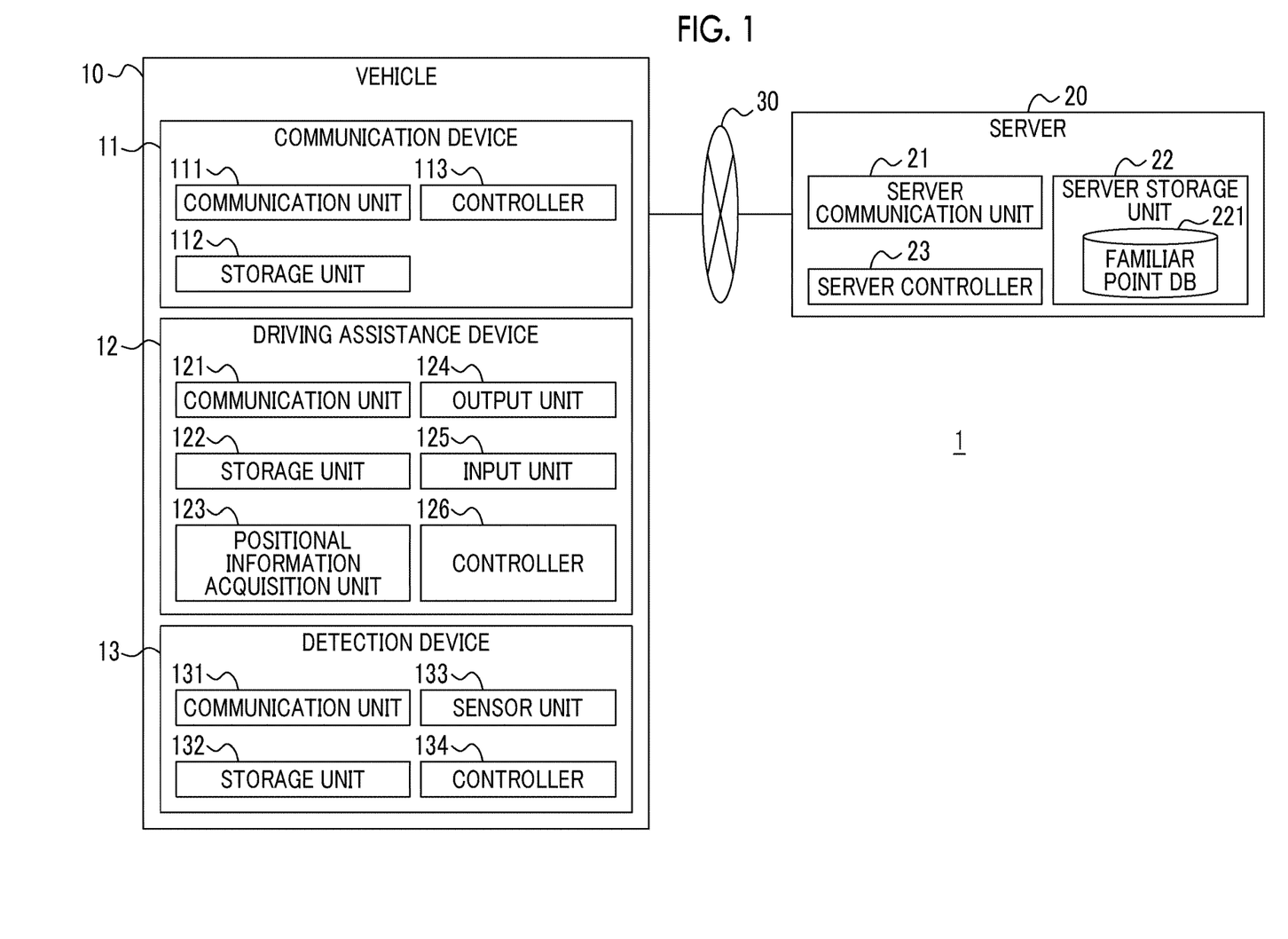
FIG. 1 is a diagram showing the schematic configuration of an information processing system according to an embodiment.

Hereinafter, an embodiment will be described.
Configuration of Information Processing System The outline of an information processing system 1 according to the embodiment will be described referring to FIG. 1. The information processing system 1 includes a plurality of vehicles 10 and a server 20. While the vehicles 10 are, for example, automobiles, the vehicles 10 are not limited thereto and may be any vehicles. In FIG. 1, for simplification of description, solely one vehicle 10 is shown. The server 20 includes one server apparatus or a plurality of server apparatuses that can perform communication with one another. Each vehicle 10 and the server 20 can perform communication, for example, through a network 30 including a mobile communication network, the Internet, and the like.

As the outline of the embodiment, the vehicle 10 acquires information of a first point and a second point on a road map from the server 20. Here, the "first point" is a point where a traveling environment of a road changes before and after the vehicle 10 passes through the point. The "second point" is a point that is provided corresponding to the first point and where a driver of the vehicle 10 is estimated to be familiar with change in traveling environment of the road due to passing through the first point. As described above, the second point is decided based on familiar points stored in the server 20. The "familiar points" include, for example, a point where determination is made that another driver is familiar with change in traveling environment after another driver who drives another vehicle 10 has passed through the first point previously.

Figure 2:
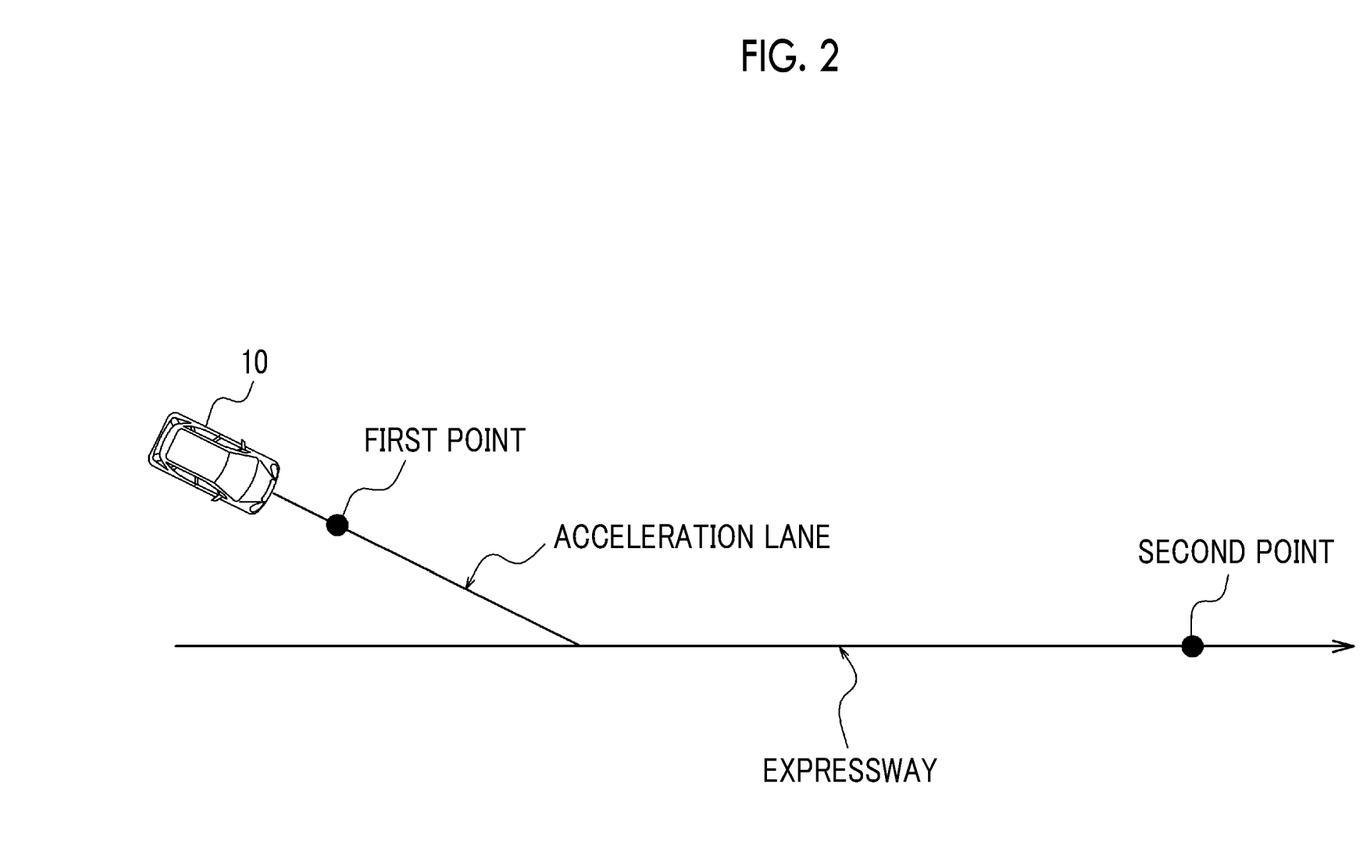
FIG. 2 is a diagram showing examples of a first point and a second point on road map data.

When a position of the second point substantially coincides with a position of the vehicle 10 after the vehicle 10 has passed through the first point, an alarm for alerting the driver of the vehicle 10 to familiarity with change in traveling environment is performed. In the example shown in FIG. 2, the first point is on an acceleration lane for joining an expressway from a general road, and the second point is on the expressway. According to such an example, at a timing at which the driver of the vehicle 10 having passed through the first point is estimated to be familiar with change in traveling environment from the general road to the expressway, an alarm to the driver is performed. The first point is not limited to the example shown in FIG. 2, and for example, a junction of a road, such as an intersection, a boundary between a curve road and a straight road, an exit of a parking lot, or the like may be determined to the first point.

In this way, according to the embodiment, since an alarm is performed at an appropriate timing even though the driver of the vehicle 10 does not have an experience of traveling on a road connecting the first point and the second point, the occurrence of a problem due to familiarity of the driver with the traveling environment of the road is reduced.

Next, each configuration of the information processing system 1 will be described in detail.
Configuration of Vehicle As shown in FIG. 1, the vehicle 10 includes a communication device 11, a driving assistance device 12, and a detection device 13. The communication device 11, the driving assistance device 12, and the detection device 13 are connected to perform communication with each other, for example, an in-vehicle network, such as a controller area network (CAN), or a dedicated line.

The communication device 11 is, for example, in-vehicle communication equipment, such as data communication module (DCM). Specifically, the communication device 11 includes a communication unit 111, a storage unit 112, and a controller 113.

The communication unit 111 includes a communication module that performs communication through the in-vehicle network or the dedicated line. Furthermore, the communication unit 111 includes a communication module that is connected to the network 30. For example, the communication unit 111 may include a communication module corresponding to a mobile communication standard, such as 4th Generation (4G) and 5th Generation (5G). In the embodiment, the vehicle 10 is connected to the network 30 through the communication unit 111.

The storage unit 112 includes one or more memories. In the embodiment, the "memory" is, for example, a semiconductor memory, a magnetic memory, an optical memory, or the like, but is not limited thereto. Each memory included in the storage unit 112 may function as, for example, a main storage device, an auxiliary storage device, or a cache memory. The storage unit 112 stores optional information that is used for the operation of the communication device 11. For example, the storage unit 112 may store a system program, an application program, identification information of the vehicle 10, and the like. Here, identification information of the communication device 11 or the driving assistance device 12 in the vehicle 10 may be used as the identification information of the vehicle 10. Information stored in the storage unit 112 may be updated with, for example, information to be acquired from the network 30 through the communication unit 111.

The controller 113 includes one or more processors. In the embodiment, the "processor" is a general-purpose processor or a dedicated processor specified to specific processing, but is not limited thereto. The controller 113 controls the overall operation of the communication device 11. In the embodiment, the vehicle 10 and the server 20 perform communication through the communication device 11 to be controlled by the controller 113.

The driving assistance device 12 is a device that performs driving assistance of the vehicle 10. Driving assistance is, for example, route guidance to a destination or an alarm to the driver, but is not limited thereto. The driving assistance device 12 may be, for example, a navigation device that performs route guidance. Driving assistance may be performed, for example, by cooperation of the driving assistance device 12 and an electronic control unit (ECU) or the like of the vehicle 10. Specifically, the driving assistance device 12 includes a communication unit 121, a storage unit 122, a positional information acquisition unit 123, an output unit 124, an input unit 125, and a controller 126.

The communication unit 121 includes a communication module that performs communication through the in-vehicle network or the dedicated line.

The storage unit 122 includes one or more memories. Each memory included in the storage unit 122 may function as, a main storage device, an auxiliary storage device, or a cache memory. The storage unit 122 stores optional information that is used for the operation of the driving assistance device 12. For example, the storage unit 122 may store a system program, an application program, a user ID of a driver, road map information, and the like. Information stored in the storage unit 122 may be updated with, for example, information to be acquired from the network 30 through the communication device 11.

The positional information acquisition unit 123 includes one or more receivers corresponding to any satellite positioning system. For example, the positional information acquisition unit 123 may include a global positioning system (GPS) receiver. The positional information acquisition unit 123 acquires positional information of the vehicle 10 in which the driving assistance device 12 is mounted.

The output unit 124 includes one or more output interfaces that output information to a user. For example, the output interfaces included in the output unit 124 are a display that outputs information in a form of video, a speaker that outputs information in a form of sound, and the like, but are not limited thereto. For example, the display is a panel display, a head-up display, or the like, but is not limited thereto. In the embodiment, "video" may include text, a still image, and a moving image.

The input unit 125 includes one or more input interfaces that detect user input. For example, the input interfaces included in the input unit 125 are physical keys, capacitance type keys, a touch screen provided integrally with the panel display of the output unit 124, a microphone that receives sound input, and the like, but are not limited thereto.

The controller 126 includes one or more processors. The controller 126 controls the overall operation of the driving assistance device 12.

For example, the controller 126 transmits an acquisition request of the positions of the first point and the second point to the server 20 through the communication unit 121 and the communication device 11. The controller 126 acquires the positions of the first point and the second point transmitted from the server 20 in response to the acquisition request through the communication unit 121 and the communication device 11, and stores the acquired positions of the first point and the second point in the storage unit 122. The controller 126 decides, as a position of a familiar point, a position of the vehicle 10 when determination is made that the driver is familiar with change in traveling environment after the vehicle 10 has passed through the first point. The controller 126 notifies the server 20 of a user ID of the driver and the position of the familiar point through the communication unit 121 and the communication device 11. A determination method about whether or not the driver is familiar with change in traveling environment will be described below.

When the position of the vehicle 10 substantially coincides with the position of the second point after the vehicle 10 has passed through the first point, the controller 126 outputs an alarm for alerting the driver of the vehicle 10 to familiarity with change in traveling environment through the output unit 124.

Details of the operation of the driving assistance device 12 to be controlled by the controller 126 will be described.

The detection device 13 is a device that detects vehicle information of the vehicle 10 and a driving behavior of the driver. Specifically, the detection device 13 includes a communication unit 131, a storage unit 132, a sensor unit 133, and a controller 134.

The communication unit 131 includes a communication module that performs communication through the in-vehicle network or the dedicated line.

The storage unit 132 includes one or more memories. Each memory included in the storage unit 132 may function as, for example, a main storage device, an auxiliary storage device, or a cache memory. The storage unit 132 stores optional information that is used for the operation of the detection device 13. For example, the storage unit 132 may store a system program, an application program, and the like. Information stored in the storage unit 132 may be updated with, for example, information to be acquired from the network 30 through the communication device 11.

The sensor unit 133 includes one or more sensors that are used for detection of the vehicle information of the vehicle 10 and the driving behavior of the driver. For example, the sensor unit 133 includes a speed sensor, an acceleration sensor, an angular velocity sensor, a steering angle sensor, an accelerator operation amount sensor, a brake depression pressure sensor, an image sensor (camera) that captures an image inside a vehicle cabin, an image sensor that captures an image outside the vehicle cabin, and the like, but is not limited thereto and may include any sensors.

The controller 134 includes one or more processors. The controller 134 controls the overall operation of the detection device 13.

For example, the controller 134 detects the vehicle information of the vehicle 10. The vehicle information may include, for example, sensor information (for example, a speed, an acceleration, an angular velocity, a steering angle, an accelerator operation amount, brake depression pressure, captured images inside and outside the vehicle cabin, and the like of the vehicle 10) output from the sensor unit 133 and an operation (for example, a passing operation or the like) of the vehicle 10 to be detected based on the sensor information. The controller 134 recognizes the driving behavior (for example, a rearward confirmation behavior or the like) of the driver based on the sensor information (for example, the captured image inside the vehicle cabin) output from the sensor unit 133. The controller 134 detects change in vehicle information of the vehicle 10 and change in driving behavior of the driver during traveling of the vehicle 10.

Configuration of Server

The server 20 includes a server communication unit 21, a server storage unit 22, and a server controller 23.

The server communication unit 21 includes a communication module that is connected to the network 30. For example, the server communication unit 21 may include a communication module corresponding to a wired local area network (LAN) standard. In the embodiment, the server 20 is connected to the network 30 through the server communication unit 21.

The server storage unit 22 includes one or more memories. Each memory included in the server storage unit 22 may function as, for example, a main storage device, an auxiliary storage device, or a cache memory. The server storage unit 22 stores optional information that is used for the operation of the server 20. For example, the server storage unit 22 may store a system program, an application program, road map information, a familiar point database 221 described below, and the like. Information stored in the server storage unit 22 may be updated with, for example, information to be acquired from the network 30 through the server communication unit 21.

Figure 3:
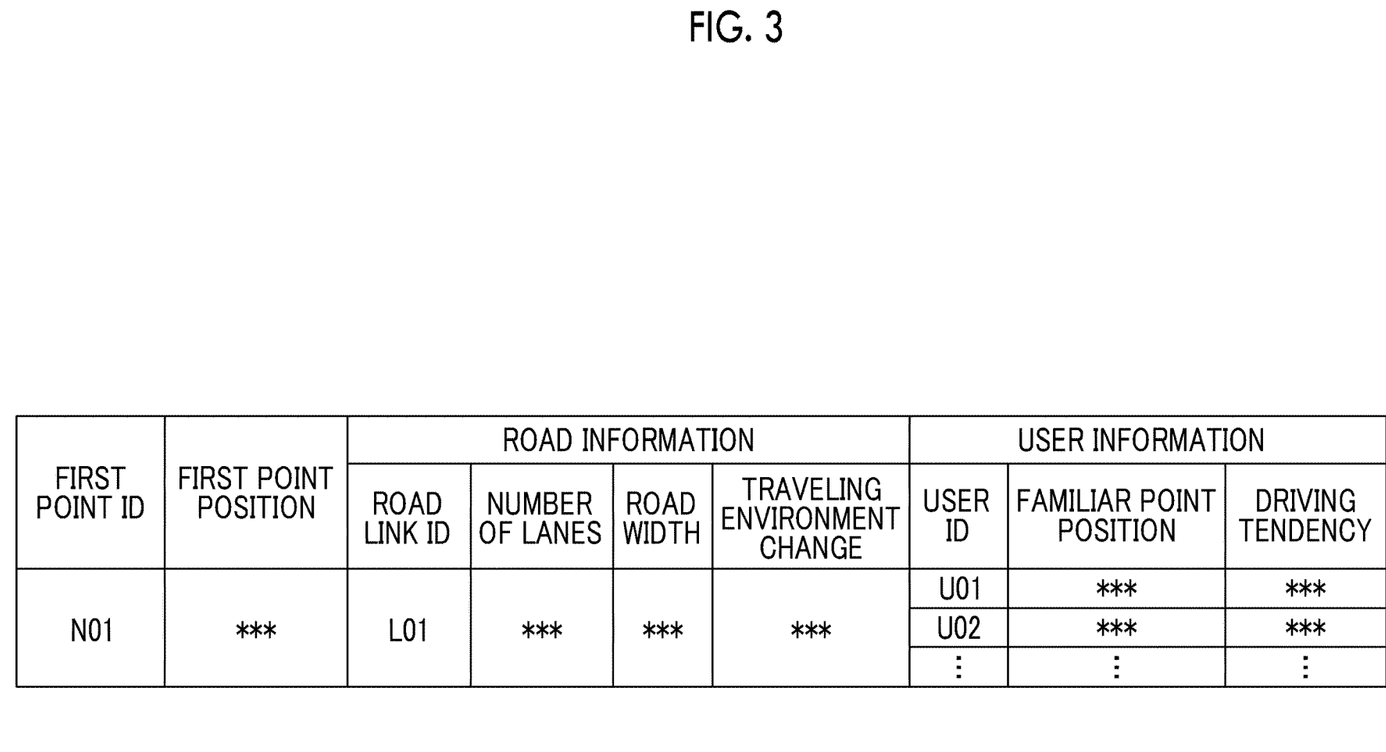
FIG. 3 is a diagram showing an example of a familiar point database that is stored in a server.

In the familiar point database 221, for example, as shown in FIG. 3, a first point ID, a first point position, a first point position, road information, and user information are stored for each first point on a road map. The first point ID is information for uniquely identifying the first point. The first point position is information indicating the position of the first point, and is indicated by a latitude and a longitude.

The road information includes, for example, items of a road link ID, the number of lanes, a road width, traveling environment change, and the like of a road on which the first point is positioned or a road on which the vehicle 10 having passed through the first point travels, but is not limited thereto and may include any items relating to the road. The road link ID is information for uniquely identifying the road, and is included in, for example, the road map information in advance. The traveling environment change is information indicating change in traveling environment of the road that changes before and after the vehicle 10 passes through the first point. For example, the traveling environment change indicates change from a general road to an expressway, change from a curve road to a straight road, change from a parking lot to a road, or the like in any data format, but is not limited thereto. The number of lanes, the road width, and the traveling environment change may be included in the road map information in advance. Alternatively, information (for example, the captured image outside the vehicle cabin, or the like) acquired during traveling by each of a plurality of vehicles 10 may be transmitted to the server 20, and the server controller 23 may detect the number of lanes, the road width, and the traveling environment change based on the information and may add the number of lanes, the road width, and the traveling environment change to the familiar point database 221.

The user information includes, for example, items of a user ID, a familiar point position, a driving tendency, and the like for each user, but is not limited thereto and may any items relating to the user who drives the vehicle 10. The user ID is information for uniquely identifying the driver. As described below, the familiar point position is a position of the familiar point on the road map where determination is made that the driver is familiar with change in traveling environment after the driver of the vehicle 10 has passed through the first point. The familiar point position may be different depending on the driver. The familiar point position may be indicated, for example, in any data format, such as a distance or a time distance from the first point or a latitude and a longitude. The familiar point position is notified from the vehicle 10 to the server 20 as described below. The driving tendency is information indicating a tendency of a driver's driving operation. For example, the driving tendency is an average acceleration at the time of starting, an average acceleration at the time of stopping, an average speed during traveling, the number of sudden steering wheel operations, the number of drifts, or the like, but is not limited thereto. The driving tendency is notified from the vehicle 10 to the server 20, for example, regularly.

The server controller 23 shown in FIG. 1 includes one or more processors. The server controller 23 controls the overall operation of the server 20.

For example, the server controller 23 specifies a first point (for example, a first point that is positioned near the vehicle 10 or in a moving direction of the vehicle 10), through which the vehicle 10 is likely to pass, from among a plurality of first points on the road map in response to a request from the vehicle 10. The server controller 23 decides a position of the second point corresponding to the first point using information stored in the familiar point database 221. A decision method of the position of the second point will be described below. The server controller 23 transmits the positions of the first point and the second point to the vehicle 10.

After the positions of the first point and the second point are transmitted to the vehicle 10, when the user ID of the driver and the position of the familiar point are received from the vehicle 10, the server controller 23 stores the user ID and the position of the familiar point in the familiar point database 221 in association with the first point ID of the first point.

Details of the operation of the server 20 to be controlled by the server controller 23 will be described below.

Operation of Driving Assistance Device

Figure 4:
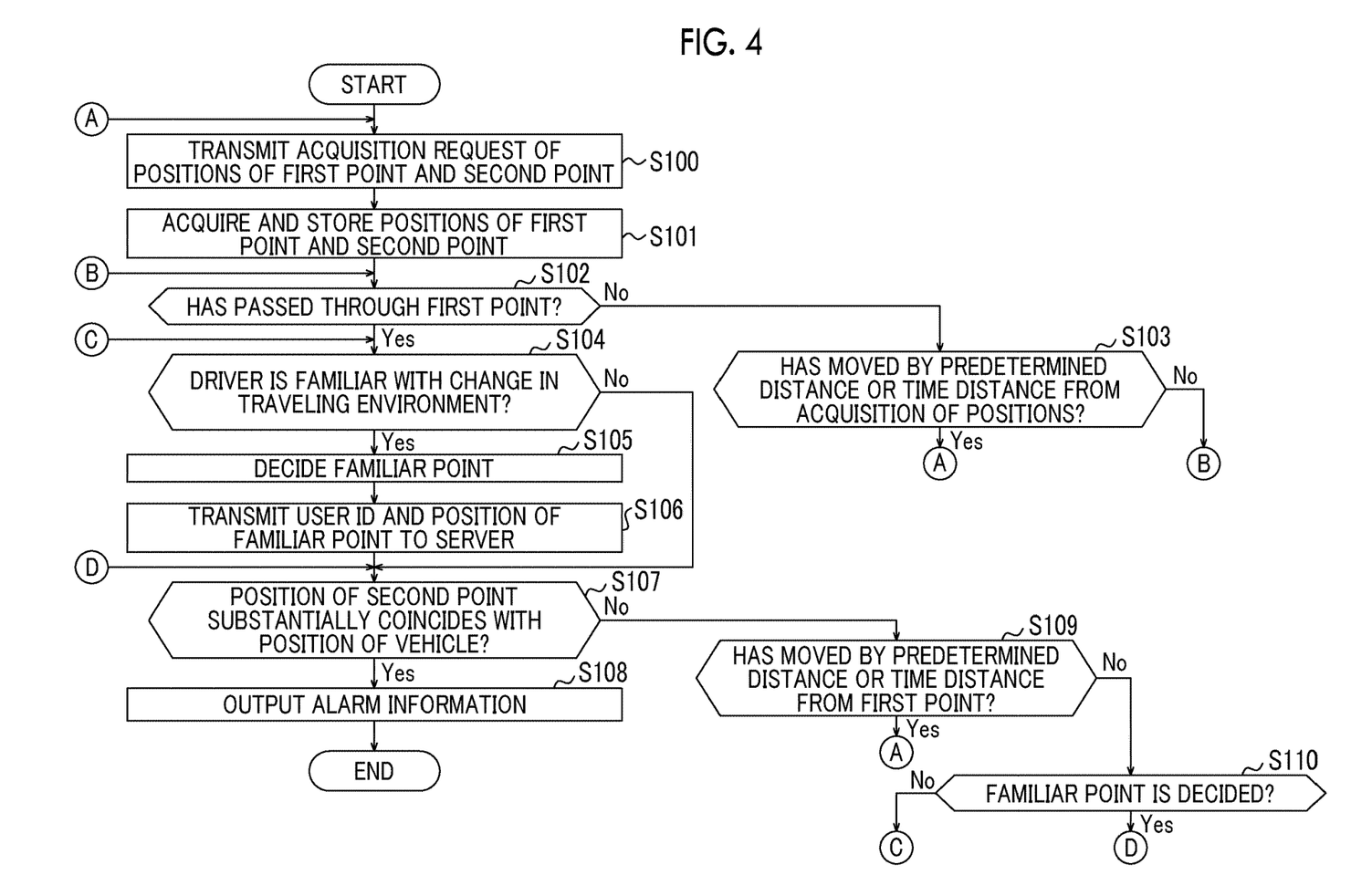
FIG. 4 is a flowchart showing an operation of a driving assistance device.

Details of the operation of the driving assistance device 12 will be described referring to FIG. 4. The operation is started, for example, regularly, but may be started at any timing.

Step S100: The controller 126 of the driving assistance device 12 transmits the acquisition request of the positions of the first point and the second point to the server 20 through the communication unit 121 and the communication device 11. The acquisition request includes, for example, the user ID of the driver and the position of the vehicle 10.

Step S101: The controller 126 acquires the positions of the first point and the second point transmitted from the server 20 through the communication unit 121 and the communication device 11 in response to the acquisition request of Step S100, and stores the positions of the first point and the second point in the storage unit 122. Here, the position of the first point (for example, the first point that is positioned near the vehicle 10 or in the moving direction of the vehicle 10), through which the vehicle 10 is likely to pass, among a plurality of first points on the road map and the position of the second point corresponding to the first point are acquired from the server 20.

Step S102: The controller 126 determines whether or not the vehicle 10 has passed through the first point, for example, based on change in positional information of the vehicle 10. When the controller 126 determines that the vehicle 10 has not passed through the first point (Step S102—No), the process progresses to Step S103. When the controller 126 determines that the vehicle 10 has passed through the first point (Step S102—Yes), the process progresses to Step S104.

Step S103: When determination is made in Step S102 that the vehicle 10 has not passed through the first point (Step S102—No), the controller 126 determines whether or not the vehicle 10 has moved by a predetermined distance or time distance after acquisition of the positions of the first point and the second point in Step S101. When the controller 126 determines that the vehicle 10 has moved by the predetermined distance or time distance (Step S103—Yes), the process returns to Step S100. When the controller 126 determines that the vehicle 10 has not moved by the predetermined distance or time distance (Step S103—No), the process returns to Step S102.

Step S104: When determination is made in Step S102 that the vehicle 10 has passed through the first point (Step S102—Yes), the controller 126 determines whether or not the driver is familiar with change in traveling environment due to passing through the first point based on at least one of change in vehicle information (for example, a speed, an acceleration, an angular velocity, a steering angle, a passing operation, or the like) of the vehicle 10 and change in driving behavior (for example, a rearward confirmation behavior or the like) of the driver detected by the detection device 13 after the vehicle 10 has passed through the first point. When the controller 126 determines that the driver is familiar with the change in traveling environment (Step S104—Yes), the process progresses to Step S105. When the controller 126 determines that the driver is not familiar with the change in traveling environment (Step S104—No), the process progresses to Step S107.

Here, a determination method about whether or not the driver is familiar with the change in traveling environment will be specifically described. The controller 126 determines whether or not one or more predetermined conditions among a first condition to a fifth condition described below are satisfied, and when determination is made that one or more conditions are satisfied, determines that the driver is familiar with the change in traveling environment. The number and the combination of one or more conditions may be determined optionally. The first condition is a condition that dispersion of the speed of the vehicle 10 to be calculated at each predetermined time becomes less than a predetermined value from the predetermined value or more after the vehicle 10 has passed through the first point. The second condition is a condition that an average value of the acceleration of the vehicle 10 to be calculated at each predetermined time falls within a predetermined range from the outside of the predetermined range including zero after the vehicle 10 has passed through the first point. The third condition is a condition that an occurrence frequency of the passing operation of the vehicle 10 becomes higher than a predetermined reference. The fourth condition is a condition that dispersion of the steering angle of the vehicle 10 to be calculated at each predetermined time becomes a predetermined value or more to less than the predetermined value after the vehicle 10 has passed through the first point. The fifth condition is a condition that an occurrence frequency of the rearward confirmation behavior of the driver is lower than a predetermined reference. However, the conditions for determination about whether or not the driver is familiar with the change in traveling environment are not limited to the first condition to the fifth condition described above, and may be any conditions capable of being determined based on the vehicle information of the vehicle 10 and the driving behavior of the driver.

Step S105: When determination is made in Step S104 that the driver is familiar with the change in traveling environment (Step S104—Yes), the controller 126 decides, as the position of the familiar point, the position of the vehicle 10 when determination is made that the driver is familiar with the change in traveling environment.

Step S106: The controller 126 transmits the user ID of the driver and the position of the familiar point decided in Step S105 to the server 20 through the communication unit 121 and the communication device 11.

Step S107: The controller 126 determines whether or not the position of the second point substantially coincides with the position of the vehicle 10. Here, the term "substantially coincide" includes a case that the distance or time distance between the second point and the vehicle 10 is equal to or less than a predetermined value. When the controller 126 determines that the position of the second point substantially coincides with the position of the vehicle 10 (Step S107—Yes), the process progresses to Step S108. When the controller 126 determines that the position of the second point does not substantially coincide with the position of the vehicle 10 (Step S107—No), the process progresses to Step S109.

Step S108: When determination is made in Step S107 that the position of the second point substantially coincides with the position of the vehicle 10 (Step S107—Yes), the controller 126 outputs an alarm for alerting the driver of the vehicle 10 to familiarity with the change in traveling environment in a form of video or sound through the output unit 124. A specific content of the alarm may be determined optionally. Then, the process ends.

Step S109: When determination is made in Step S107 that the position of the second point does not substantially coincide with the position of the vehicle 10 (Step S107—No), the controller 126 determines whether or not the vehicle 10 has moved from the first point by the predetermined distance or time distance. When the controller 126 determines that the vehicle 10 has moved from the first point by the predetermined distance or time distance (Step S109—Yes), the process returns to Step S100. When the controller 126 determines that the vehicle 10 has not moved from the first point by the predetermined distance or time distance (Step S109—No), the process progresses to Step S110.

Step S110: When determination is made in Step S109 that the vehicle 10 has not moved from the first point by the predetermined distance or time distance (Step S109—No), the controller 126 determines whether or not the familiar point has been decided by way of Step S105. When the controller 126 determines that the familiar point has been decided (Step S110—Yes), the process returns to Step S107. When the controller 126 determines that the familiar point has not been decided (Step S110—No), the process returns to Step S104.

Operation of Server

Figure 5:
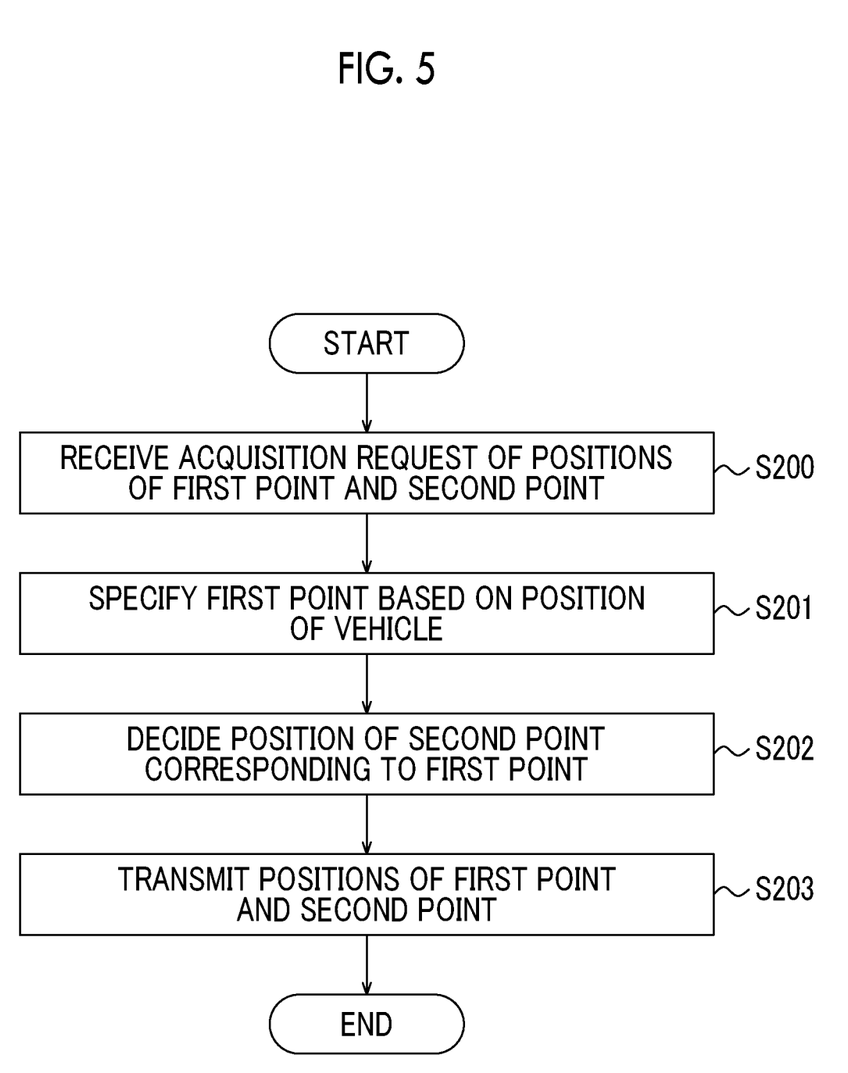
FIG. 5 is a flowchart showing an operation of the server.

Details of the operation of the server 20 will be described referring to FIG. 5.

Step S200: The server controller 23 of the server 20 receives the acquisition request of the positions of the first point and the second point from the vehicle 10 through the server communication unit 21.

Step S201: The server controller 23 specifies the first point (for example, the first point that is positioned near the vehicle 10 or in the moving direction of the vehicle 10), through which the vehicle 10 is likely to pass, among a plurality of first points on the road map based on the position of the vehicle 10 included in the acquisition request of Step S200.

Step S202: The server controller 23 decides the position of the second point corresponding to the first point using information stored in the familiar point database 221.

Specifically, the server controller 23 extracts a plurality of familiar point positions corresponding to the first point specified in Step S201 from the familiar point database 221. Here, in the familiar point database 221, the familiar point positions of the driver of the vehicle 10 corresponding to the first point may not always be stored. That is, each familiar point position to be extracted may be a familiar point position of another driver who has passed the first point previously. Then, the server controller 23 decides an average of the extracted familiar point positions as the position of the second point. With such a configuration, even though the driver of the vehicle 10 has no experience of traveling on a road passing through the first point, it is possible to decide the position of the second point using the familiar point positions of another driver.

In extracting the familiar point positions from the familiar point database 221, the server controller 23 may selectively extract, from the familiar point database 221, familiar point positions of each of a plurality of other drivers who has a driving tendency substantially coincident with the driver of the vehicle 10 among the familiar point positions associated with the first point specified in Step S201. Although the position of the familiar point may be different depending on the driving tendency of the driver, since the position of the second point is decided selectively using the familiar point positions of another driver who has a driving tendency substantially coincident with the driver of the vehicle 10, an error between a point where the driver of the vehicle 10 is actually familiar with the change in traveling environment and the second point is reduced, and it is possible to perform an alarm at an appropriate timing.

Alternatively, the server controller 23 specifies another first point that has road information substantially coincident with the first point specified in Step S201, and through which the driver of the vehicle 10 has passed previously, among a plurality of first points on the road map. The server controller 23 extracts the familiar point position of the driver of the vehicle 10 corresponding to another first point from the familiar point database 221. Then, the server controller 23 decides, as the position of the second point, a position of a point at the distance in the moving direction of the vehicle 10 from the first point specified in Step S201 along the road based on the distance between another first point and the extracted familiar point position. With such a configuration, even though the driver of the vehicle 10 has no experience of traveling on the road passing through the first point specified in Step S201, it is possible to decide the position of the second point using the familiar point position decided when the driver has traveled another road having similar road information previously.

Step S203: The server controller 23 transmits the position of the first point specified in Step S201 and the position of the second point decided in Step S202 to the vehicle 10 through the server communication unit 21. Then, the process ends.

As described above, the driving assistance device 12 according to the embodiment stores the position of the first point on the road map where the traveling environment of the road changes, and outputs the alarm for alerting the driver of the vehicle 10 after the vehicle 10 has passed through the first point. With such a configuration, even though the driver has no experience of traveling on the road passing through the first point, since the alarm is performed, the occurrence of a problem due to familiarity with the traveling environment of the road that changes before and after the vehicle 10 passes through the first point is reduced.

Although the disclosure has been described based on the drawings and the example, it should be noted that those skilled in the art can easily make various modifications and corrections based on the present disclosure. Accordingly, it should be noted that such modifications and corrections are included in the scope of the disclosure. For example, the functions and the like included in respective means or respective steps can be rearranged as long as there is no logical contradiction, and two or more means or steps may be combined into single means or step or may be divided.

For example, in the above-described embodiment, a configuration in which another device has a part of the configurations and the functions of the communication device 11, the driving assistance device 12, and the detection device 13 in the vehicle 10 may be made. For example, a part of the processing to be executed in the vehicle 10 in the above-described embodiment may be executed in the server 20, and a part of the processing to be executed in the server 20 may be executed in the vehicle 10.

In the above-described embodiment, a configuration in which the driving assistance device 12 performs the alarm using the position of the second point acquired from the server 20 has been described. In a modification example of the embodiment, a configuration in which the driving assistance device 12 performs an alarm without using the position of the second point may be made. As the outline, when determination is made that the driver is familiar with the change in traveling environment after the vehicle 10 has passed through the first point, the driving assistance device 12 performs the alarm. The operation of the driving assistance device 12 according to the modification example will be described referring to FIG. 6.

Figure 6:
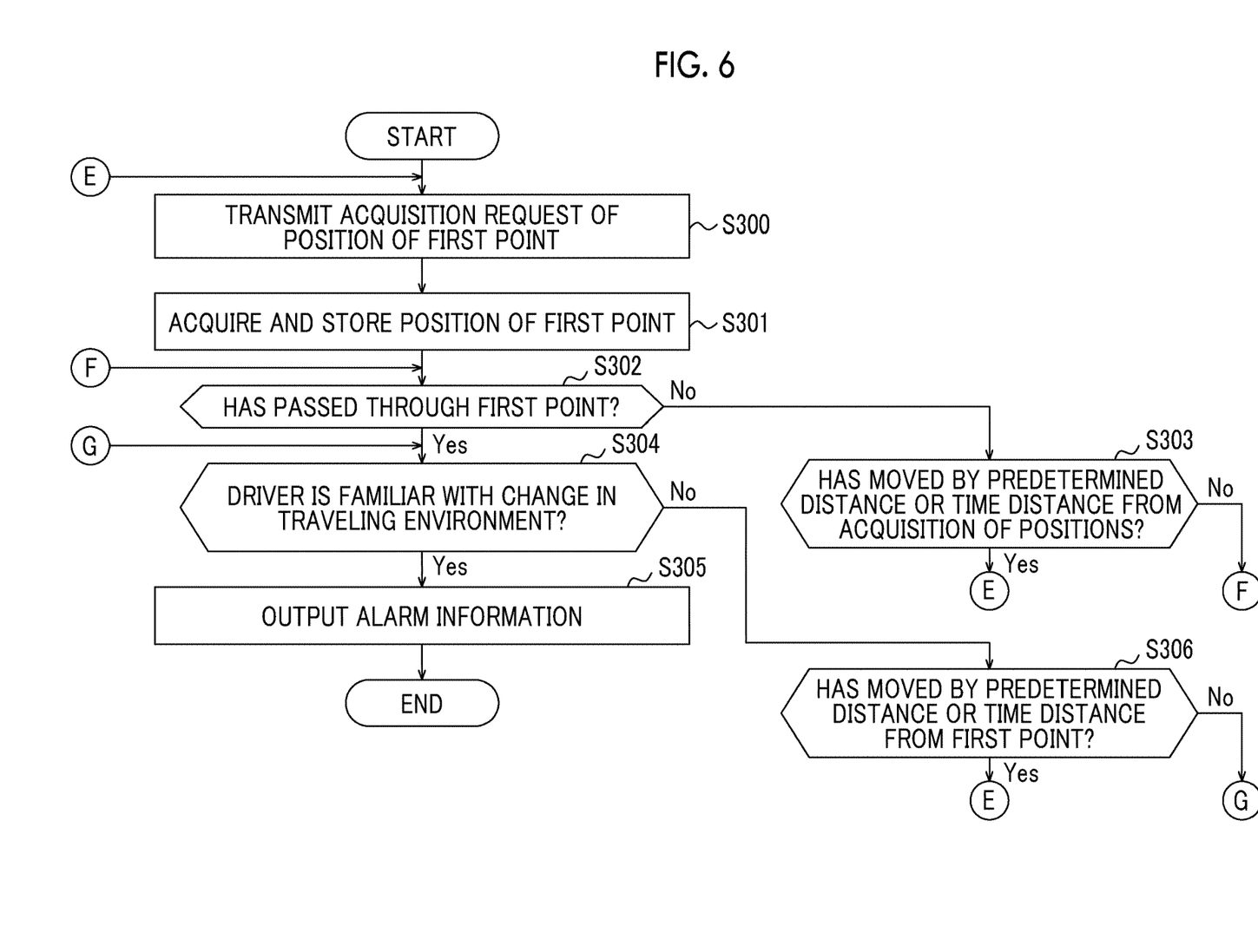
FIG. 6 is a flowchart showing an operation of a driving assistance device according to a modification example of the embodiment.

Step S300: The controller 126 of the driving assistance device 12 transmits an acquisition request of the position of the first point to the server 20 through the communication unit 121 and the communication device 11. The acquisition request includes, for example, the user ID of the driver and the position of the vehicle 10.

Step S301: The controller 126 acquires the position of the first point transmitted in response to the acquisition request of Step S300 from the server 20 through the communication unit 121 and the communication device 11, and stores the position of the first point in the storage unit 122. Here, the position of the first point (for example, the first point that is positioned near the vehicle 10 or in the moving direction of the vehicle 10), through which the vehicle 10 is likely to pass, among a plurality of first points on the road map is acquired from the server 20.

Step S302: The controller 126 determines whether or not the vehicle 10 has passed through the first point based on change in positional information of the vehicle 10. When the controller 126 determines that the vehicle 10 has not passed through the first point (Step S302—No), the process progresses to Step S303. When the controller 126 determines that the vehicle 10 has passed through the first point (Step S302—Yes), the process progresses to Step S304.

Step S303: When determination is made in Step S302 that the vehicle 10 has not passed through the first point (Step S302—No), the controller 126 determines whether or not the vehicle 10 has moved by the predetermined distance or time distance after acquisition of the position of the first point in Step S301. When the controller 126 determines that the vehicle 10 has moved by the predetermined distance or time distance (Step S303—Yes), the process returns to Step S300. When the controller 126 determines that the vehicle 10 has not moved by the predetermined distance or time distance (Step S303—No), the process returns to Step S302.

Step S304: When determination is made in Step S302 that the vehicle 10 has passed through the first point (Step S302—Yes), the controller 126 determines whether or not the driver is familiar with change in traveling environment due to passing through the first point based on at least one of change in vehicle information (for example, a speed, an acceleration, an angular velocity, a steering angle, a passing operation, or the like) of the vehicle 10 and change in driving behavior (for example, a rearward confirmation behavior or the like) of the driver detected by the detection device 13 after the vehicle 10 has passed through the first point. When the controller 126 determines that the driver is familiar with the change in traveling environment (Step S304—Yes), the process progresses to Step S305. When the controller 126 determines that the driver is not familiar with the change in traveling environment (Step S304—No), the process progresses to Step S306.

Step S305: When determination is made in Step S304 that the driver is familiar with the change in traveling environment (Step S304—Yes), the controller 126 outputs the alarm for alerting the driver of the vehicle 10 to familiarity with the change in traveling environment in a form of video or sound through the output unit 124. Then, the process ends.

Step S306: When determination is made in Step S304 that the driver is not familiar with the change in traveling environment (Step S304—No), the controller 126 determines whether or not the vehicle 10 has moved from the first point by the predetermined distance or time distance. When the controller 126 determines that the vehicle 10 has moved from the first point by the predetermined distance or time distance (Step S306—Yes), the process returns to Step S300. When the controller 126 determines that the vehicle 10 has not moved from the first point by the predetermined distance or time distance (Step S306—No), the process progresses to Step S304.

In the above-described embodiment, a case where a specific content of the alarm that is performed when determination is made that the position of the second point corresponding to the first point substantially coincides with the position of the vehicle 10 may be determined optionally has been described. Here, for example, in a majority of vehicles 10 among a plurality of vehicles 10 that has passed through the first point, when a specific condition among the first condition to the fifth condition described above is satisfied, and thus, determination is made that the driver is familiar with the change in traveling environment, an alarm according to the specific condition may be performed. Specifically, in the majority of vehicles 10 that have passed through the first point, when the third condition that the occurrence frequency of the passing operation of the vehicle 10 becomes higher than the predetermined reference is satisfied, and thus, determination is made that the driver is familiar with the change in traveling environment, for example, an alarm including a message "This is a point where the occurrence frequency of the passing operation tends to become high. Please avoid an unreasonable passing operation and pay attention to passing of another vehicle." may be performed.

A configuration in which, for example, a general-purpose electronic apparatus functions as the driving assistance device 12 according to the above-described embodiment may be made. Specifically, a program in which processing contents for implementing the functions of the driving assistance device 12 according to the embodiment are described is stored in a memory of the electronic apparatus, and the program is read and executed on a processor of the electronic apparatus. Accordingly, the disclosure according to the embodiment can be implemented as a program to be executable by the processor.

What is claimed is:

1. A driving assistance device for a vehicle, the driving assistance device comprising:
   a storage unit configured to store a position of a first point on a road map where a change in traveling environment of a road exists; and
   a controller configured to
      output an alarm for alerting a driver of the vehicle after the vehicle has passed through the first point,
      determine whether or not the driver is familiar with change in traveling environment based on at least one of change in vehicle information of the vehicle and change in driving behavior of the driver after the vehicle has passed through the first point, and
      when determination is made that the driver is familiar with the change in traveling environment, transmit, to a server, a position of the vehicle when determination is made that the driver is familiar with the change in traveling environment.

2. A driving assistance device for a vehicle, the driving assistance device comprising:
   a storage unit configured to store a position of a first point on a road map where a change in traveling environment of a road exists; and
   a controller configured to
      output an alarm for alerting a driver of the vehicle after the vehicle has passed through the first point,
      receive a position of a second point on the road map corresponding to the first point from a server; and
      when the position of the second point substantially coincides with a position of the vehicle after the vehicle has passed through the first point, output the alarm.

3. The driving assistance device according to claim 2, wherein the second point is decided based on a position of another vehicle when determination is made that another driver who drives the other vehicle is familiar with change in traveling environment, and the determination is made based on at least one of change in vehicle information of the other vehicle and change in driving behavior of the other driver after the other vehicle has passed through the first point previously.

4. The driving assistance device according to claim 3, wherein the other vehicle is a vehicle driven by the other driver who has a tendency of a driving operation substantially coincident with the driver of the vehicle.

5. The driving assistance device according to claim 2, wherein the second point is decided based on (i) another first point on the road map through which the vehicle has passed previously and (ii) a position of the vehicle when determination is made that the driver is familiar with change in traveling environment based on at least one of change in vehicle information of the vehicle and change in driving behavior of the driver after the vehicle has passed through the other first point previously.

6. The driving assistance device according to claim 5, wherein the other first point is a first point that has road information substantially coincident with the first point among a plurality of first points on the road map.

7. The driving assistance device according to claim 2, wherein the second point is set to a point at a predetermined distance from the first point in a moving direction of the vehicle along a road.

8. The driving assistance device according to claim 2, wherein the change in traveling environment of the road is at least one of (i) change from a general road to an expressway, (ii) change from a curve road to a straight road, and (iii) change from a parking lot to a road.

9. A driving assistance device for a vehicle, the driving assistance device comprising:
   a storage unit configured to store a position of a first point on a road map where a change in traveling environment of a road exists; and a controller configured to output an alarm for alerting a driver of the vehicle after the vehicle has passed through the first point, wherein the controller is configured to output the alarm when determination is made that the driver is familiar with change in traveling environment after the vehicle has passed through the first point, and the determination is made based on at least one of (i) change in vehicle information of the vehicle and (ii) change in driving behavior of the driver.

10. The driving assistance device according to claim 1, wherein the change in traveling environment of the road is at least one of (i) change from a general road to an expressway, (ii) change from a curve road to a straight road, and (iii) change from a parking lot to a road.

11. A non-transitory computer-readable storage medium storing a driving assistance program for a vehicle, the driving assistance program causing a controller to execute storing, a position of a first point on a road map where a traveling environment of a road changes;

outputting an alarm for alerting a driver of the vehicle after the vehicle has passed through the first point;

determining whether or not the driver is familiar with change in traveling environment based on at least one of change in vehicle information of the vehicle and change in driving behavior of the driver after the vehicle has passed through the first point; and when determination is made that the driver is familiar with the change in traveling environment, transmit, to a server, a position of the vehicle when determination is made that the driver is familiar with the change in traveling environment.

12. A control method of a driving assistance device for a vehicle, the control method comprising:

storing, on a storage device of the driving assistance device, a position of a first point on a road map where a traveling environment of a road changes;

outputting an alarm, with an output of the driving assistance device, for alerting a driver of the vehicle after the vehicle has passed through the first point;

determining, using a controller of the driving assistance device, whether or not the driver is familiar with change in traveling environment based on at least one of change in vehicle information of the vehicle and change in driving behavior of the driver after the vehicle has passed through the first point; and when determination is made by the controller of the driving assistance device that the driver is familiar with the change in traveling environment, causing the driving assistance device to transmit, to a server, a position of the vehicle when determination is made that the driver is familiar with the change in traveling environment.

13. The driving assistance device according to claim 9, wherein the change in traveling environment of the road is at least one of (i) change from a general road to an expressway, (ii) change from a curve road to a straight road, and (iii) change from a parking lot to a road.

* * * * *